United States Patent [19]

Tanno et al.

[11] 3,859,383

[45] Jan. 7, 1975

[54] GRAFT-POLYMER COMPRISING ACRYLIC RUBBER AND UNSATURATED COMPOUND GRAFTED THERETO AND BLENDS THEREOF WITH PVC

[75] Inventors: Seikichi Tanno; Hisashi Kohgame; Tadashi Muroi, all of Hitachi, Japan

[73] Assignees: Hitachi, Ltd.; Hitachi Chemical Company, Ltd., both of Tokyo, Japan

[22] Filed: Sept. 11, 1972

[21] Appl. No.: 287,720

[30] Foreign Application Priority Data
Sept. 10, 1971  Japan.................................. 46-69677
Sept. 10, 1971  Japan.................................. 46-69678

[52] U.S. Cl...... 260/876 R, 260/80.72, 260/86.1 N, 260/881, 260/882, 260/884, 260/885
[51] Int. Cl............................................... C08f 29/24
[58] Field of Search................................ 260/876 R

[56] References Cited
UNITED STATES PATENTS
3,448,173  6/1969  Ryan et al........................... 260/876
3,655,825  4/1972  Souder et al...................... 260/876 R Primary Examiner—Murray Tillman
Assistant Examiner—C. J. Seccuro
Attorney, Agent, or Firm—Craig & Antonelli

[57] ABSTRACT

A graft-polymer comprising an acrylic rubber obtained by polymerization of an acrylate ester represented by the formula $CH_2=CH-COOR_1$, where $R_1$ is an alkyl group having 2 to 8 carbon atoms, with a hexahydro-s-triazine compound represented by the formula

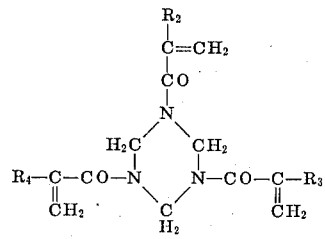

$R_2$ to $R_4$: —H and/or —$CH_3$ and a polymerizable unsaturated compound grafted to the acrylic rubber.

14 Claims, No Drawings

GRAFT-POLYMER COMPRISING ACRYLIC RUBBER AND UNSATURATED COMPOUND GRAFTED THERETO AND BLENDS THEREOF WITH PVC

BACKGROUND OF THE INVENTION

This invention relates to a graft copolymer resin comprising an acrylic rubber and a graft polymer of a polymerizable unsaturated compound which is excellent in impact resistance, tensile strength and weather resistance.

Ternary graft copolymer resins obtained from a diene-type rubber component, an aromatic vinyl monomer and other polymerizable monomer, such as acrylonitrile-butadiene-styrene copolymer resins (ABS resins), have heretofore been utilized broadly as being resins excellent in impact resistance. However, since copolymer resins of this type contain a great amount of a diene-type rubber component, generally a butadiene component, as the molecule-constituting component, these resins are readily deteriorated in air, especially outdoors, by ultraviolet rays, which results in reduction of impact resistance and elongation and occurrence of undesired phenomena such as surface cracking. Therefore, improvements for overcoming such defects are desired in the art.

With a view to preventing deterioration in ternary graft copolymer resins, especially ABS resins, when exposed to the outdoors, attempts were made to improve deterioration resistance in these resins by incorporating therein many of commercially available ultraviolet absorbents and antioxidants, and various stabilizers disclosed in literature references. However it was found that the degree of improvement attained by any of these additives is very low, and the weather resistance of such resins incorporated with these additives are still extremely inferior to other graft copolymer resins free of any diene-type rubber component. As a result, it was considered that high improvement of weather resistance in ABS resins would not be attainable unless the diene-type component be excluded from the resins.

As a rubber component having no double bonds which can be substituted for the diene-type rubber component, a rubber component comprising as the indispensable component butyl acrylate or ethyl acrylate has been recommended because of the facility of the polymerization operation, the cheap cost and the property of copolymerizing readily with many vinyl monomers. Thus, many methods have been proposed to graft such rubber component with vinyl monomers. Since acrylate ester rubbers, unlike diene-type rubbers, have no double bond and they have no radical activating point, in general, a vinyl monomer is not graft-polymerized to such rubbers and in many cases the resulting product is a mere blend of the acrylic rubber and vinyl polymer. For this reason, when such product is injection-molded, the resulting molded article lacks surface gloss and is found to have an uneven surface appearance. Furthermore, such properties as impact resistance and tensile strength are extremely bad.

Accordingly, there has been proposed a method for enhancing the compatibility between the rubber component and vinyl polymer by stopping the polymerization of the rubber component when the conversion reaches about 30 percent and polymerizing a vinyl monomer in the presence of the so formed rubber component. However, when this method was reproduced it was found that although the compatibility between the rubber component and vinyl polymer is increased and the surface gloss is improved with less surface unevenness, the resin is very inferior in the impact resistance and the properties of this resin are not sufficient for engineering plastics.

It was considered that the reason why resins obtained by grafting various vinyl monomers to polyacrylic acid esters lack gloss with surface unevenness and are inferior in mechanical properties such as impact resistance and tensile strength would be that the grafting efficiency of vinyl monomers to acrylic rubbers is low. Therefore, the inventors initially grafted 10 – 50 percent of a polybutadiene rubber to a butyl acrylate rubber such as mentioned above and then grafted a vinyl monomer to the resulting graft copolymer. As a result, mechanical properties such as impact resistance and tensile strength were considerably improved, but the weather resistance tested while exposing specimens to the outdoors was low and not as different from the weather resistance of a resin formed by employing polybutadiene alone as the rubber component. Accordingly, it was presumed that use of even a small amount of a diene-type rubber would result in reduction of the weather resistance.

The present invention provides a new graft polymer obtained by graft-polymerization of an acrylic rubber with a polymerizable unsaturated monomer wherein the acrylic rubber contains in the molecule thereof the molecular structures represented by the following formulae:

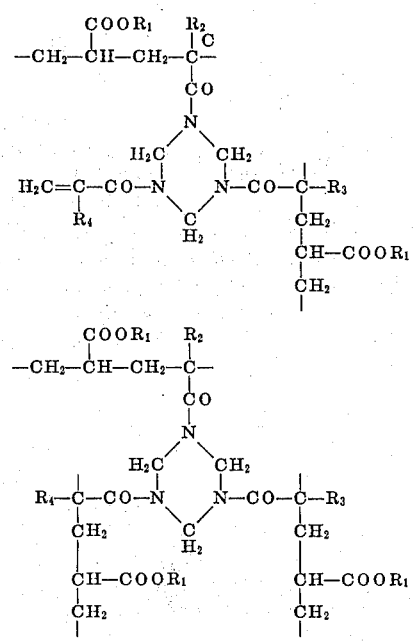

wherein $R_1$ is an alkyl group having 2 to 8 carbon atoms and $R_2$, $R_3$ and $R_4$ are each a hydrogen atom and/or a methyl group ($-CH_3$).

The acrylic rubber used in the present invention is produced by copolymerization of the predominant amount of acrylate ester $CH_2=CH-COOR_1$ with a hexahydro-s-triazine compound represented by the following formula:

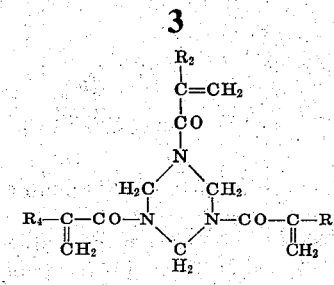

The acrylic rubber mentioned above is thought to be a mixture of the three kind of molecules of which molecular structures are set forth by formulae, I, II and III. The polymerizable unsaturated compound reacts on the double bonds in the molecules set forth by I and II to form a graft-polymer.

In accordance with this invention, even if a small amount of the above cross-linking agent is copolymerized, the intended improvement of the gloss is attained in the resulting graft copolymer resins, and it is possible to obtain a graft copolymer resin which has highly improved impact resistance and tensile strength and is much superior to ABS resins in respect to weather resistance.

In this invention, polymerization of acrylic acid esters may be accomplished by the emulsion polymerization method as in the case of polymerization of polybutadiene. In this case, the polymerization is generally carried out at high temperatures (45°–80°C.) but a low temperature method (lower than 20°C.) may be adopted.

In this invention, properties of the intended copolymer resin may vary depending on the particle size of the acrylic rubber, but it has been found that an average particle size ranging from 0.05 to 0.5 micron results in obtaining well balanced properties of the impact resistance and tensile strength. In case the average particle size is less than 0.05 micron in the acrylic rubber, the impact resistance is lowered and, in case the particle size exceeds 0.5 micron, reduction of the tensile strength and gloss is observed.

However, in the case of a polymerization method in which the particle size of the acrylic rubber is made great at the graft polymerization, such as a method comprising addition of a small amount of a polyvinyl alcohol, an organic acid, an inorganic acid or an electrolyte, even if the particle size of the acrylic rubber is less than 0.05 micron, a resin having an excellent impact resistance can be obtained. Furthermore, a graft copolymer resin excellent in the impact resistance can be obtained by coagulating the acrylic rubber once, dissolving the rubber component in the unsaturated monomer and then effecting the polymerization according to the bulk (block) polymerization or suspension polymerization method.

As compared with a conventional resin formed by merely grafting a polymerizable unsaturated monomer to a butyl acrylate rubber, the graft copolymer resin formed according to this invention is extremely excellent in properties required of engineering plastics, such as impact resistance, tensile strength and gloss, and moreover, it has a good moldability.

Such excellent characteristics of the resin obtained according to this invention cannot be impaired by adding thereto various molding assistances such as pigments, lubricants and plasticizers by a kneading method or the like.

Further, when the graft-polymer of this invention is blended in a known thermoplastic resin, the impact resistance and moldability of such resin can be enhanced.

In the preparation of acrylic rubbers used in this invention, it is possible to copolymerize up to 30 percent by weight of an aromatic vinyl monomer (e.g., styrene), acrylonitrile, methyl methacrylate or other polymerizable unsaturated monomer in addition to the above-mentioned acrylate ester and triazine compound. By such incorporation, some changes are brought about in properties of the intended resins, but considerable influence of reducing the improved characteristics of the resin is not observed.

As the acrylate ester, all of the compounds of the above general formula where $R_1$ is an alkyl group having 2 to 8 of carbon atoms are effectively used in this invention, but ethyl acrylate and butyl acrylate are especially advantageous. When $R_1$ is $-CH_3$, the resulting copolymer is too hard to use it as a rubbery component.

As the polymerizable unsaturated monomer to be used in an amount of up to 30 percent by weight, there may be mentioned, monovinyl compounds, such as for instance, styrene, vinyl toluene, tert-butyl styrene, acrylonitrile, acrylic acid, methyl acrylate, monochlorostyrene, dichlorostyrene, α-methylstyrene, methacrylic acid, methyl methacrylate or the like.

In this invention, the mixing ratio of the acrylate ester and triazine compound as a cross-linking agent may be optionally selected in the synthesis of the acrylic rubber. In general, it is advantageous that the latter (i.e., the triazine compound) is used in an amount of 0.05 – 20 parts by weight per 99.95 – 80 parts by weight of the former (the total parts of both ester and triazine compound being equal to 100). In case the amount of the triazine compound is smaller than 0.05 part by weight, there is a tendency that the cross-linking density is lowered so that the impact property is unsatisfactory. In case the amount of the cross-linking agent is larger than 20 parts by weight, a cross-linking density is too high so that the impact property will become reduced.

As the polymerizable unsaturated monomer to be grafted to the acrylic rubber, there are used such unsaturated monomers as exemplified with respect to the monomer to be copolymerized with the acrylic ester. Among them, styrene, acrylonitrile and methyl methacrylate are preferable compounds.

The amount of the unsaturated monomer to be grafted to the acrylic rubber is chosen within a broad range, but in general, the object of this invention can be effectively attained at a grafting efficiency of more than 1 percent. When the grafting efficiency is heightened, the impact resistance is improved but there is observed a tendency that a low grafting efficiency results in reduction of the impact resistance. Accordingly, the amount of the unsaturated monomer is properly chosen so that the desired grafting efficiency will be attained. In general, the unsaturated monomer is graft polymerized in an amount of from 97 – 30 parts by weight per 3 – 70 parts by weight of the acrylic rubber (the total of both being 100 parts). In this amount, it has been found by many experiments that about 2 – 8 percent of the graft-efficiency is obtained.

The grafting of the unsaturated monomer to the acrylic rubber may be performed by a known polymerization method. For instance, there may be adopted a method comprising graft polymerizing the unsaturated monomer in the presence of an acrylic rubber latex.

It is permissible that the graft copolymer resin obtained according to this invention may be incorporated with additives such as pigments, deterioration-inhibitors, ultraviolet absorbents, lubricants and plasticizers. Characteristic properties of the resin are not damaged by incorporation of such additives.

The hexahydro-s-triazine compound used in the present invention includes the following compounds:

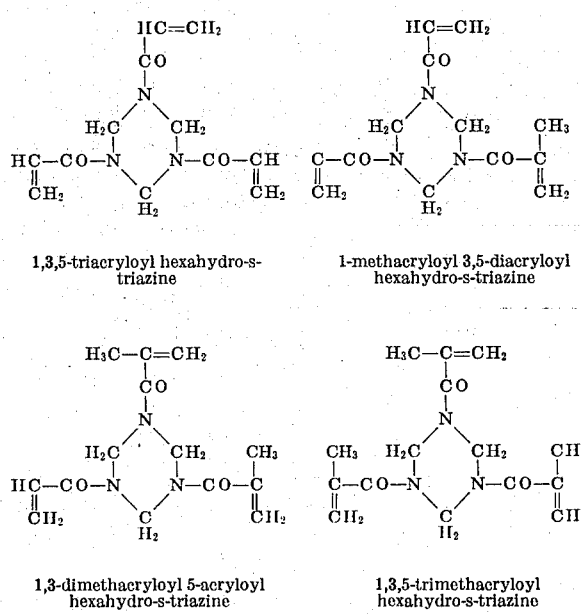

1,3,5-triacryloyl hexahydro-s-triazine 1-methacryloyl 3,5-diacryloyl hexahydro-s-triazine 1,3-dimethacryloyl 5-acryloyl hexahydro-s-triazine 1,3,5-trimethacryloyl hexahydro-s-triazine Although the chemical structure of the graft-polymer has not been fully determined yet, the graft-polymer is thought to be the mixture of different molecules having the molecular structures (i.e., reoccurring units) as shown in the following:

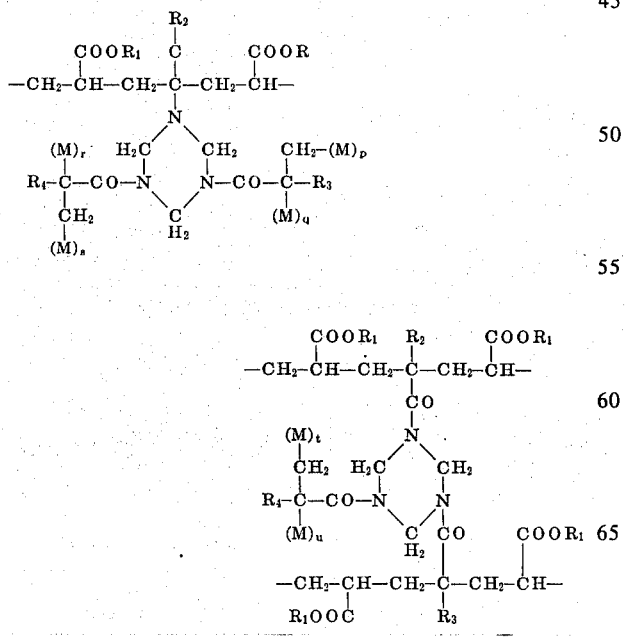

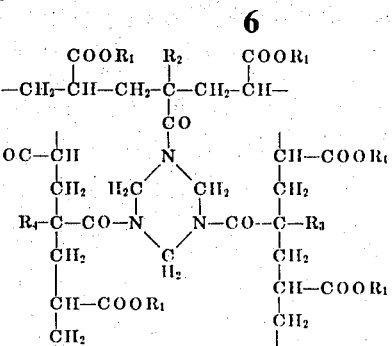

$R_1$: alkyl group having 2 to 8 carbon atoms
$R_2$ to $R_4$: —H and/or —$CH_3$
M: residue of an unsaturated monome and/or polymer
p–u: integers $\geq 1$ It should be noted that the graft-polymer according to the present invention is not composed only of the molecules having the molecular structures set forth above, but is characterized in that the graft-polymer contains the above molecular structures in the proportion corresponding to the amount of triazine compound used.

As an example of the present invention, there is shown in the following the scheme of the reaction, wherein butyl acrylate is used as an acrylate ester, 1,3,5-triacryloyl hexahydro-s-triazine as a triazine compound, and styrene as a polymerizable unsaturated monomer.

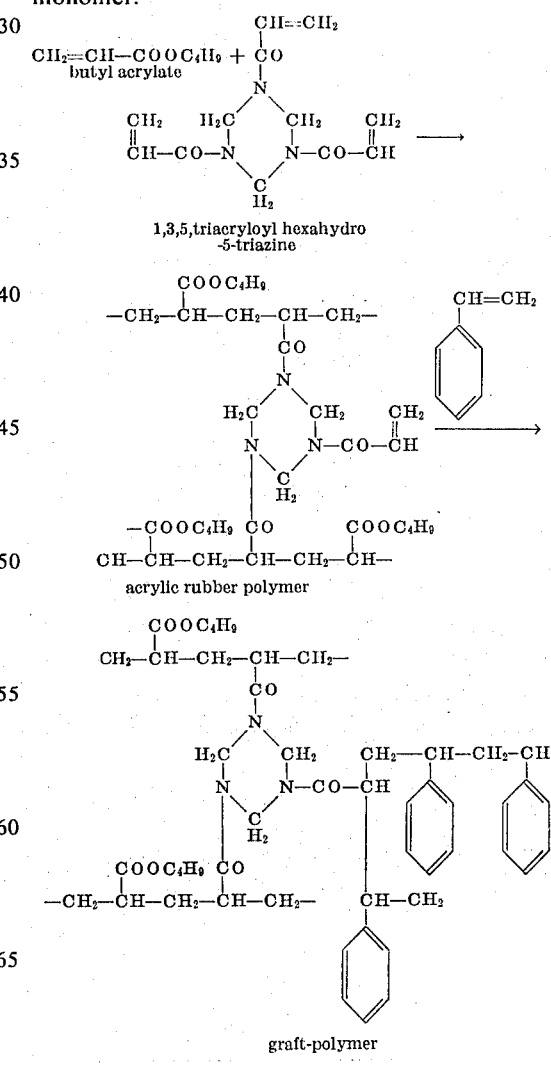

graft-polymer

It goes without saying that all styrene does not form the graft-polymer, but a part thereof reacts on the double bonds present in the acrylic rubber polymer.

The graft-polymer according to the present invention is particularly useful as a blending material for various thermoplastic resins having affinity thereto, such as, polyvinyl chloride resin, polyvinylidene chloride resin, polymethacrylate, styrene-acrylonitrile copolymer and the like.

This invention will now be illustrated by reference to the following Examples of its specific embodiments and Comparative Examples illustrating conventional techniques. However, the scope of this invention is not to be considered limited by these Examples. In each Example all "parts" are on the weight basis.

EXAMPLE 1

A. Synthesis of Acrylic Rubber:

An aqueous solution and a monomer solution, each having the following composition, were prepared and reacted for 5 hours in a three-neck glass flask. The conversion was 95 percent.

| Aqueous solution: | |
|---|---|
| water | 200 parts |
| sodium oleate | 2.0 parts |
| $Na_2SO_3$ | 0.05 part |
| potassium persulfate | 0.5 part |
| Monomer solution: | |
| butyl acrylate | 90 parts |
| styrene | 10 parts |
| 1.3.5-trimethacryloyl hexahydro-s-triazine | 0.5 part |

B. Synthesis of Graft Copolymer Resin:

The acrylic rubber latex prepared in (A) above was used. A three-neck glass flask was charged with an aqueous system and a monomer solution, each having the following composition, and the mixture was emulsified by agitation and polymerized.

| Aqueous System: | |
|---|---|
| water | 100 parts |
| polyvinyl alcohol | 1.8 parts |
| acrylic rubber latex | 70 parts |
| Monomer Solution: | |
| styrene | 70 parts |
| methyl methacrylate | 10 parts |
| acrylonitrile | 20 parts |
| lauroyl peroxide | 0.16 part |
| tert-dodecylmercaptan | 0.3 part |

Since, in this case, when the polymerization is advanced to a degree of 40 – 60 percent of the conversion and, the viscosity of the polymer system increases to destroy the emulsion state, the acrylic resin latex was further dispersed by addition of 150 parts of a 0.2 percent aqueous solution of polyvinyl alcohol. The polymerization was continued for 10 hours until the conversion reached 96 percent.

Characteristic properties of the resulting intended graft copolymer resin are as follows:

| Impact strength | 16.2 Kg-cm/cm |
|---|---|
| Tensile strength | 375 Kg/cm² |
| Elongation | 19.2% |

When the weather resistance test was effected on the above resin in the same manner as in Example 1, the following results were obtained:

| Impact strength | 16.0 Kg-cm/cm |
|---|---|
| Tensile strength | 382 Kg/cm² |
| Elongation | 15.0% |

EXAMPLE 2

A. Synthesis of Acrylic Rubber Latex:

An aqueous solution and a monomer solution, each having the following composition, were prepared and charged in a three-neck glass flask.

| Aqueous Solution: | |
|---|---|
| water | 200 parts |
| potassium persulfate | 0.5 part |
| sodium oleate | 2.0 parts |
| $Na_2SO_3$ | 0.05 part |
| Monomer Solution: | |
| butyl acrylate | 99.0 parts |
| 1.3.5-triacryloyl hexahydro-s-triazine | 1.0 part |

The above mixture was maintained in a nitrogen flow with stirring at 60°C. for 3 hours and at 70°C. for 3 hours. Since generation of heat by the polymerization was violent, the flask was cooled with ice at times. Then the reaction was conducted at 80°C. for about 4 hours to attain a conversion of 96 percent.

B. Synthesis of Graft Copolymer Resin:

The acrylic rubber latex obtained in (A) above was used. A three-neck glass flask was charged with an aqueous system and a monomer solution, each having the following composition, and the mixture was agitated sufficiently to obtain an emulsion.

| Aqueous system: | |
|---|---|
| water | 150 parts |
| sodium oleate | 2 parts |
| acrylic rubber latex | 70 parts |
| Monomer solution: | |
| styrene | 80 parts |
| acrylonitrile | 20 parts |
| tert-dodecylmercaptan | 0.3 part |

The above emulsified mixture was maintained under agitation at 70°C. After the polymerization had been performed for 7 hours (conversion=98 percent), the resulting polymer was salted out with potassium chloride, washed sufficiently and dried to obtain the intended graft copolymer resin. Then, the product was subjected to an action of an extruder and injection-molded at 210°C. The mechanical properties of the resulting molded article were tested to obtain results shown below:

| Impact strength (Izod) | 22.0 Kg-cm/cm |
|---|---|
| Tensile strength | 380 Kg/cm² |
| Elongation | 21.0% |

The molded article was subjected to the weather resistance test where it was exposed to the outdoors in the position facing south with an inclination of 45° for 3 months (from Mar. 5, 1971 to June 4, 1971 at Hitachi-city, Ibaraki-prefecture, Japan). The test results are as follows:

| Impact strength | 21.0 Kg-cm/cm |
|---|---|
| Tensile strength | 382 Kg/cm² |
| Elongation | 16.0% |

As is seen from the foregoing test results, the characteristic properties of the resin were hardly changed by the outdoor exposure. Further, no change was observed in the surface gloss of the molded article, i.e., the surface gloss of the resin.

EXAMPLE 3

A. Acrylic Rubber:

An acrylic rubber prepared in the same manner as in Example 2 was used.

B. Synthesis of Graft Copolymer Resin:

In the same manner as in Example 2, an aqueous system and a monomer solution, each having the following composition, were charged in a three-neck glass flask, emulsified by agitation and polymerized.

| Aqueous system: | |
|---|---|
| water | 100 parts |
| polyvinyl alcohol | 2.0 parts |
| acrylic rubber latex | 200 parts |
| Monomer solution: | |
| styrene | 15.0 parts |
| methyl methacrylate | 15.0 parts |
| acrylonitrile | 5.0 parts |
| lauroyl peroxide | 0.05 part |
| tert-dodecylmercaptan | 0.38 part |

In this case, the emulsion state was destroyed when the conversion reached 30–50 percent and therefore, the resin component was futher dispersed by addition of 200 parts of a 0.2 percent aqueous solution of polyvinyl alcohol. The polymerization was continued for 8 hours to attain a conversion of 95 percent.

Characteristic properties of the resulting intended graft copolymer resin are as follows:

| Impact strength | 8.5 Kg-cm/cm |
|---|---|
| Tensile strength | 190 Kg/cm$^2$ |
| Elongation | 130% |

The following results were obtained at the weather resistance test made in the same manner as in Example 1.

| Impact strength | 7.5 Kg-cm/cm |
|---|---|
| Tensile strength | 201 Kg/cm$^2$ |
| Elongation | 119% |

Conventional techniques employing diene type rubbers will now be illustrated by reference to Comparative Examples.

COMPARATIVE EXAMPLE 1

Polybutadiene rubber latex (Rubber Latex No. 700; manufactured by Nippongosei Rubber Co.) was employed. An aqueous system and a monomer solution, each having the following composition, were charged in a three-neck glass flask, and they were emulsified by sufficient agitation.

| Aqueous system: | |
|---|---|
| water | 150 parts |
| sodium oleate | 2 parts |
| No. 700 | 70 parts |
| potassium persulfate | 0.5 part |
| Na$_2$SO$_3$ | 0.05 part |
| Monomer solution: | |
| styrene | 80 parts |
| acrylonitrile | 20 parts |
| tert-dodecylmercaptan | 0.3 part |

The mixture was maintained at 70°C. under agitation in a nitrogen flow, and the polymerization was carried out for 5 hours (conversion=96 percent). Then, the graft polymer was salted out with potassium chloride, washed sufficiently and dried to obtain a graft copolymer resin.

The so obtained graft polymer was subjected to an action of an extruder and injection-molded at 270°C. Mechanical properties of the resulting molded article are as follows:

| Impact strength | 33 Kg-cm/cm |
|---|---|
| Tensile strength | 400 Kg/cm$^2$ |
| Elongation | 38% |

The following results were obtained at the weather resistance test made in the same manner as in Example 1:

| Impact strength | 3 Kg-cm/cm |
|---|---|
| Tensile strength | 350 Kg/cm$^2$ |
| Elongation | 0.9% |

COMPARATIVE EXAMPLE 2

With the use of the following aqueous system and monomer solution, the polymerization was carried out (conversion=95 percent) in the same manner as in Comparative Example 1 to prepare a graft copolymer resin.

| Aqueous system: | |
|---|---|
| water | 150 parts |
| No. 700 | 80 parts |
| sodium pulmitate | 1 part |
| potassium persulfate | 0.5 part |
| Na$_2$SO$_3$ | 0.05 part |
| Monomer solution: | |
| styrene | 55 parts |
| acrylonitrile | 20 parts |
| methyl methacrylate | 20 parts |
| tert-dodecylmercaptan | 0.4 part |

Characteristic properties of the so prepared graft copolymer resin are as follows:

| Impact strength | 25 Kg-cm/cm |
|---|---|
| Tensile strength | 390 Kg/cm$^2$ |
| Elongation | 29% |

The following results were obtained at the weather resistance test made in the same manner as in Example 1:

| Impact strength | 3 Kg-cm/cm |
|---|---|
| Tensile strength | 320 Kg/cm$^2$ |
| Elongation | 1% |

As is seen from the foregoing results, in graft copolymer resins obtained by employing a diene-type rubber, reduction of various characteristic properties is extreme under the outdoor exposure. Moreover, in molded products of such resins, the surface is colored yellow or brown with disappearance of the gloss under the outdoor exposure.

Polyvinyl chloride resin is widely used as one of general plastics because of its excellent mechanical properties such as tensile strength and also low cost. However, vinyl chloride resin has disadvantages in that it is decomposed severely to cause color change and deterioration of the mechanical properties at usual injection molding temperatures of plastics (above 200°C.) and sometimes an ill influence is given even after the injection molding. Another disadvantage is that among mechanical properties, impact strength is lower than that of the other general thermoplastic resins.

Some methods have been proposed for eliminating those disadvantages of polyvinyl chloride resin. These methods may be divided roughly into two groups. One group of the methods comprises adding a plasticizer to the polyvinyl chloride resin and the other group comprises modifying polyvinyl chloride resin by blending it together with a graft copolymer of excellent molding workability and shock resistance such as ABS resin or methyl methacrylate/butadiene/styrene resin (MBS resin). However, in the former methods, as compared with the case of polyvinyl chloride resin alone, a heat distortion temperature, hardness and tensile strength of the product are far inferior. On the other hand, according to the latter methods, though polyvinyl chloride resin can be improved in impact strength and molding workability without suffering a substantial loss of its excellent mechanical strength, impact strength and elongation of the product are reduced significantly, since the product is readily oxidized by sunlight or ultraviolet rays due to the fact that many double bonds are contained in the molecular chain of the ABS resin or MBS resin employed. Still another method comprises blending the polyvinyl chloride resin together with polyethylene chloride or ethylene/vinyl acetate copolymer. However, this method has also a demerit that the resulting product is readily changed in color if it is exposed to sunlight or to the weather.

After intensive investigations, the inventors have found that the above mentioned disadvantages can be overcome by blending the polyvinyl chloride resin with the graft copolymer according to the present invention.

The graft polymer of the invention is preferably blended in an amount of 3 to 30 parts by weight per 100 parts of the polyvinyl chloride resin. When the amount is less than 3 parts, the resulting blended resin has a poor impact resistance, and when the amount is larger than 30 parts, a tensile strength of the resulting blended resin is considerably lowered.

The polyvinyl chloride resin composition according to the present invention may be incorporated as well known with further additives such as pigments, inhibitors, ultraviolet-ray absorbents, lubricants and plasticizers.

The present invention will be illustrated more concretely by way of Examples and Comparative Examples, which Examples by no means limit the invention. Parts in the following Examples are given by weight.

EXAMPLE 4

A. Preparation of acrylic rubber

In a glass reactor, 400 parts of water, 1 part of potassium persulfate, 0.1 part of sodium sulfite and 4.4 parts of sodium oleate were charged. Then 200 parts of butyl acrylate and 0.5 part (No. 1), 1.0 part (No. 2) and 2.0 parts (No. 3), respectively, of 1,3,5-triacryloyl hexahydro-s-triazine were added to the mixture. After emulsification, the mixture was allowed to react under nitrogen stream at 60°C. for 2 hours and then at 70°C. for 3 hours.

B. Preparation of graft copolymer

Polymerization of methyl methacrylate and acrylonitrile was carried out in the presence of the acrylic rubber latex obtained in (A) in the following manner.

In a glass reactor, 135 parts of water and 206 parts of acrylic rubber latex selected from the above samples Nos. 1-3 were charged and the resulting mixture was further added with 29.1 parts of methyl methacrylate, 2.2 parts of acrylonitrile and 0.38 part of tert.-dodecylmercaptan under stirring. The emulsion polymerization was carried out under nitrogen stream and under heating at 70°C. for 5 hours. Thus resulting graft copolymer was salted out with calcium chloride solution, washed with water, dehydrated and dried at 80°C.

Thereafter, 100 parts of polyvinyl chloride resin (degree of polymerization =1,000) and a suitable amount of said graft copolymer were blended together on a heated roll at 170°C. to obtain the final polyvinyl chloride resin composition. The above graft copolymer had a good compatibility with vinyl chloride resin. A sheet of a smooth rolled surface was obtained after the rolling. The sheet was subjected to pressing at a temperature of 150°-170°C. and mechanical properties and weather resistance of the product were measured. The results are shown in Tables 1 and 2.

Table 1

Mechanical Properties

| Acrylic rubber (No.) | Amount of graft copolymer (part) | Impact strength (Kg-cm/cm$^2$) | Tensile strength (Kg/cm$^2$) | Flow property (x10$^{-3}$cc/s) |
|---|---|---|---|---|
| 1 | 15 | Above 100 | 450 | 0.4 |
| 2 | 15 | Above 100 | 451 | 0.5 |
| 3 | 15 | Above 100 | 448 | 0.4 |
| 3 | 10 | Above 100 | 485 | 0.5 |
| 3 | 5 | Above 54 | 510 | 0.6 |
| In the absence of hexahydro-s-triazine compound* | 15 | 2 | 420 | 1.0 |
| Polyvinyl chloride resin only** | — | 2 | 530 | 0.2 |

*Triazine compound was not used in the preparation of acrylic rubber.
**Polyvinyl chloride resin was not incorporated with any graft copolymer.

(In Table 1 and in the following Examples, impact strength and tensile strength were measured according to the specification of JIS-6871 and JIS-6301, respectively; flow property was measured with a Koka flow tester, a plunger extrusion-type rheometer produced by the Shimazu Seisakusho Co. Ltd., Japan, at a load of 20 Kg, nozzle size of 1 mm in diameter × 2 mm in length and temperature of 190°C.)

Table 2

| Acrylic rubber (No.) | Amount of graft copolymer (part) | Weather Resistance Impact strength (Kg-cm/cm²) 300 hrs. | 600 hrs. | Tensile strength (Kg/cm²) 300 hrs. | 600 hrs. | Surface condition of resin 300 hrs. | 600 hrs. |
|---|---|---|---|---|---|---|---|
| 1 | 15 | Above 100 | 96 | 453 | 451 | gloss no crack | gloss no crack |
| 2 | 15 | do. | 93 | 453 | 450 | do. | do. |
| 3 | 15 | do. | 89 | 450 | 450 | do. | do. |
| 3 | 10 | do. | 91 | 3 | 483 | do. | do. |
| 3 | 5 | 52 | 45 | 497 | 495 | do. | do. |
| Blend of polyvinyl chloride and ABS resin* | 15 | 3.0 (above 100) | | 457 (571) | 450 | crack (gloss, no crack**) | crack |

*100 parts of polyvinyl chloride resin incorporated with 15 parts of conventional ABS resin.
**initial properties (weather resistance was determined by irradiating a sample with a sunshine type weather meter for a predetermined period of time and measuring degree of reduction of the sample in various properties. Time in Table 2 represents irradiation time. Weather resistance in the following Examples were determined also in this manner.)

EXAMPLE 5

A graft copolymer was prepared by using acrylic rubber latex No. 3 prepared in Example 4 in the following manner.

In a glass reactor, 130 parts of water and 210 parts of the acrylic rubber latex were charged. The mixture was then added with 60 parts of methyl methacrylate, 10 parts of acrylonitrile, 0.4 part of tert.-dodecylmercaptan and 0.2 part of lauroyl peroxide under stirring. Emulsion polymerization was carried out under nitrogen stream at 70°C. Demulsification was caused after 2 hours of polymerization, and then 0.2 percent aqueous polyvinyl alcohol solution was added thereto to obtain suspension system. Suspension polymerization was further effected at 70°C. for 6 hours and then at 80°C. for 3 hours thereby completing the polymerization. Thus resulting graft copolymer was dehydrated and then dried at 80°C. to obtain powdery product.

Thereafter, 100 parts of vinyl chloride resin (degree of polymerization = 850) and a suitable amount of said graft copolymer were blended together in the same manner as in Example 4 to obtain the final polyvinyl chloride resin composition.

Mechanical properties and weather resistance of thus resulting polyvinyl chloride resin composition are shown in Tables 3 and 4.

Table 3

| Amount of graft copolymer (part) | Mechanical Properties Impact strength (Kg-cm/cm²) | Tensile strength (Kg/cm²) | Flow property (×10⁻³cc/s) |
|---|---|---|---|
| 15 | Above 100 | 501 | 0.5 |
| 10 | 74 | 512 | 0.7 |
| 5 | 35 | 528 | 0.9 |

Table 4

| Amount of graft copolymer (part) | Weather Resistance Impact strength (Kg-cm/cm²) 300 hrs. | 600 hrs. | Tensile strength (Kg/cm²) 300 hrs. | 600 hrs. | Surface Condition of Resin 300 hrs. | 600 hrs. |
|---|---|---|---|---|---|---|
| 15 | Above 100 | Above 100 | 508 | 505 | No change | No change |
| 10 | 72 | 68 | 510 | 510 | do. | do. |
| 5 | 35 | 32 | 532 | 521 | do. | do. |

EXAMPLE 6

A. Preparation of acrylic rubber

In a glass reactor, 400 parts of water, 1 part of potassium persulfate, 0.1 part of sodium sulfite and 4.4 parts of sodium oleate were charged. Then 170 parts of butyl acrylate, 30.0 parts of styrene and 0.5 part of triacryl triazine were added to the mixture. After emulsification, the mixture was allowed to react under nitrogen steam at 60°C. for 2 hours and then at 70°C. for 3 hours. Thus obtained acrylic rubber latex was salted out with calcium chloride aqueous solution, washed and dried.

B. Preparation of graft copolymer

Methyl methacrylate, styrene and acrylonitrile were polymerized in the presence of acrylic rubber latex prepared in (A) in the following manner.

In a glass reactor, 135 parts of water and 206 parts of the acrylic rubber latex were charged. The mixture was then added with 40 parts of 5 percent aqueous polyvinyl alcohol solution and further with 19.1 parts of methyl methacrylate, 10 parts of styrene, 2.2 parts of acrylonitrile, 0.38 parts of tert-dodecylmercaptan and 0.2 part of lauroyl peroxide under stirring. Emulsion polymerization was carried out under nitrogen stream at 70°C. Demulsification was caused after 2 hours of polymerization, and then 100 parts of 0.2 percent aqueous polyvinyl alcohol solution was added thereto to obtain suspension system. Suspension polymerization was further effectd at 70°C. for 6 hours and then at 80°C. for 3 hours thereby completing the polymerization. Thus resulting graft copolymer was dehydrated and then dried at 80°C. to obtain powdery product.

Thereafter, 100 parts of polyvinyl chloride resin and a suitable amount of the graft copolymer were blended together in the same manner as in Example 4 to obtain the final polyvinyl chloride resin composition.

Mechanical properties and weather resistance of thus obtained polyvinyl chloride resin composition are shown in Tables 5 and 6.

Table 5
Mechanical Properties

| Amount of graft copolymer (part) | Impact strength (Kg-cm/cm²) | Tensile strength (Kg/cm²) | Flow property (x10⁻³cc/s) |
|---|---|---|---|
| 15 | Above 100 | 460 | 0.5 |
| 10 | Above 100 | 506 | 0.6 |
| 5 | 52 | 519 | 0.7 |

Table 6
Weather Resistance

| Amount of graft copolymer (part) | Impact strength (Kg-cm/cm²) 300 hrs. | 600 hrs. | Tensile strength (Kg/cm²) 300 hrs. | 600 hrs. | Surface Condition of resin 300 hrs. | 600 hrs. |
|---|---|---|---|---|---|---|
| 15 | Above 100 | Above 100 | 462 | 461 | No change | No change |
| 10 | do. | do. | 507 | 500 | do. | do. |
| 5 | 51 | 48 | 519 | 513 | do. | do. |

EXAMPLE 7

A. Synthesis of Acrylic Rubber:

In a glass flask 400 parts of water, 0.5 part of potassium persulfate, 0.1 part of sodium sulfurous acid, 4.4 parts of suspending agent (NS soap manufactured by Kaoh Sekken Co. Japan) were charged, and 200 parts of hexyl acrylate and 0.5 part of 1,3,5-triacryloyl hexahydro-s-triazine were added to the mixture. The reactant solution was emulsified and maintained in a nitrogen flow at 60°C. for 5 hours and, thereafter, the solution was heated at 80°C. for 3 hours.

B. Synthesis of Graft-Copolymer Resin:

In a glass reaction vessel 135 parts of water and 200 parts of acrylic rubber produced in (A) above were charged, and 13.5 parts of methyl methacrylate, 7.5 parts of styrene, 9.0 parts of acrylonitrile and 0.3 part of tert-dodecylmercaptan were further charged in the reaction vessel to carry out emulsion polymerization in a nitrogen flow at 70°C. for 5 hours.

The resulting graft-polymer was separated by salting out with a calcium chloride solution, and washed and dehydrated, and then dried at 80°C.

C. Polyvinyl-chloride Resin Composition:

100 parts of polyvinyl chloride resin (polymerization degree 1,300) and various amounts of the graft-polymer produced in (B) above were homogeneously blended with each other in the same manner as in Example 4 to obtain desired polyvinyl chloride resin compositions. The graft-polymer was easily blended with the polyvinyl chloride resin; when kneaded with rolls a sheet material having a smoothed surface was obtained.

The resulting sheet was pressed-shaped at 150° - 170°C. and mechanical properties and weather resistance thereof were measured as shown in Table 7 and Table 8.

Table 7
Mechanical Properties

| Amount of graft-polymer (part) | Impact strength (Kg-cm/cm²) | Tensile strength (Kg/cm²) | Flow property (x10⁻³cc/s) |
|---|---|---|---|
| 15 | Above 100 | 451 | 0.5 |
| 10 | 50 | 480 | 0.7 |
| 5 | 33 | 501 | 0.8 |

Table 8
Weather Resistance

| Amount of graft-polymer (part) | Impact Strength (Kg-cm/cm²) 300 hrs. | 600 hrs. | Tensile Strength (Kg/cm²) 300 hrs. | 600 hrs. | Surface condition of resin 300 hrs. | 600 hrs. |
|---|---|---|---|---|---|---|
| 15 | Above 100 | 80 | 453 | 448 | No change | No change |
| 10 | 47 | 45 | 480 | 480 | do. | do. |
| 5 | 33 | 30.5 | 505 | 499 | do. | do. |

EXAMPLE 8

A. Synthesis of acrylic rubber 400 parts of water, 0.5 part of potassium persulfate, 0.1 part of sulfurous acid and 4.4 parts of suspending agent (NS soap) were charged in the glass reactor vessel, and then 200 parts of octyl acrylate and 0.5 part of 1,3,5-triacryloyl hexahydro-s-triazine were added to the reactant solution. The emulsion polymerization was carried out in a nitrogen flow at 60°C. for 5 hours and at 80°C. for 3 hours.

B. Synthesis of Graft-polymer

In a glass flask 135 parts of water and 200 parts of acrylic rubber latex produced in (A) above were charged and thereafter 40 parts of 5 percent polyvinyl alcohol aqueous solution was added to the mixture. Under agitation, 13.5 parts of methyl methacrylate, 7.5 parts of styrene, 9.0 parts of acrylonitrile, 0.9 part of lauroyl peroxide and 0.3 part of tert-dodecyl mercaptan were added to the mixture and emulsion polymerization was carried out in a nitrogen flow at 70°C. After 2 hour polymerization the emulsion in the reactant system was broken, and therefore 100 parts of 0.2 percent polyvinyl alcohol aqueous solution was added to the reactant systems. In this condition, the emulsion polymerization was further continued at 70°C. for 6 hours and at 80°C. for 3 hours.

The resulting graft-polymer was dehydrated, washed and dried at 80°C. to obtain a powdery graft polymer.

C. Polyvinyl-chloride Resin composition

As similar to Example 7, 100 parts of polyvinyl chloride resin and the graft-polymer were kneaded to obtain polyvinyl chloride resin compositions. The mechanical properties and weather resistance are shown in Table 9 and Table 10.

Table 9

Mechanical properties

| Amount of graft-polymer(part) | Impact strength (Kg-cm/cm$^2$) | Tensile strength (Kg/cm$^2$) | Flow property (×10$^{-3}$cc/s) |
| --- | --- | --- | --- |
| 15 | 96 | 453 | 0.5 |
| 10 | 70 | 486 | 0.6 |
| 5 | 36 | 512 | 0.8 |

Table 10

Weather Resistance

| Amount of graft-polymer(part) | Impact strength (Kg-cm/cm$^2$) | | Tensile strength (Kg/cm$^2$) | | Surface Condition of Resin | |
| --- | --- | --- | --- | --- | --- | --- |
| | 300 hrs. | 600 hrs. | 300 hrs. | 600 hrs. | 300 hrs. | 600 hrs. |
| 15 | 90 | 82 | 455 | 450 | No change | No change |
| 10 | 71 | 64 | 487 | 485 | do. | do. |
| 5 | 35 | 33 | 515 | 511 | do. | do. |

While the novel principles of the invention have been described, it will be understood that various omissions, modifications and changes in these principles may be made by one skilled in the art without departing from the spirit and scope of the invention.

What is claimed is:

1. A polyvinyl chloride resin composition comprising:
   a. 100 parts by weight of a polyvinyl chloride resin,
   b. 3 to 30 parts by weight of a graft-polymer homogeneously blended with the polyvinyl chloride resin, said graft-polymer comprising 3 to 70 percent by weight based on the weight of said graft copolymer of an acrylic rubber and 97 to 30 percent by weight based on the weight of said graft copolymer of a polymerized monovinyl compound grafted to double bonds in the acrylic rubber, wherein said acrylic rubber is a copolymer comprising 99.95 to 80 percent by weight of a polymerized acrylate ester represented by the formula $CH_2=CH-COOR_1$, wherein $R_1$ is an alkyl group having 2 to 8 carbon atoms, and 0.05 to 20 percent by weight of a hexahydro-s-triazine compound represented by the following formula:

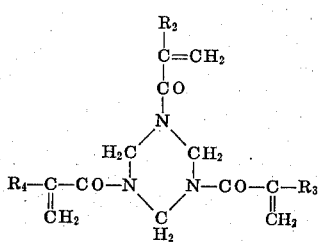

wherein $R_2$ to $R_4$ are each a member selected from the group consisting of a hydrogen atom and methyl group, each being the same or different.

2. A polyvinyl chloride resin composition according to claim 1, wherein the monovinyl compound is at least one member selected from the group consisting of styrene, vinyl toluene, tert-butyl styrene, acrylonitrile, acrylic acid, methyl acrylate, monochlorostyrene, dichlorostyrene, α-methylstyrene, methacrylic acid and methyl methacrylate.

3. A polyvinyl chloride resin composition according to claim 1, wherein the hexahydro-s-triazine compound is at least one member selected from the group consisting of 1,3,5-triacryloyl hexahydro-s-triazine, 1-methacryloyl-3,5-diacryloyl hexahydro-s-triazine, 1,3-dimethylacryloyl-1,5-acryloyl hexahydro-s-triazine and 1,3,5-trimethacryloyl hexahydro-s-triazine.

4. A polyvinyl chloride resin composition according to claim 1, wherein the graft-efficiency of the monovinyl compound to the acrylic rubber is about 2 to 8 percent.

5. A polyvinyl chloride resin composition according to claim 1, wherein the monovinyl compound is a member selected from the group consisting of styrene, acrylonitrile and methyl methacrylate.

6. A polyvinyl chloride resin composition according to claim 1, wherein the monovinyl compound is at least one member selected from the group consisting of vinyl aromatics, unsaturated nitriles and acrylic and methacrylic acid and esters.

7. A polyvinyl chloride resin composition comprising:
   a. 100 parts by weight of a polyvinyl chloride resin,
   b. 3 to 30 parts by weight of a graft-polymer homogeneously blended with the polyvinyl chloride resin, said graft-polymer comprising 3 to 70 percent by weight based on the weight of said graft copolymer of an acrylic rubber and 97 to 30 percent by weight based on the weight of said graft copolymer of a polymerized monovinyl compound grafted to double bonds in the acrylic rubber, wherein said acrylic rubber is a copolymer comprising 99.95 to 80 percent by weight of a polymerized acrylate ester represented by the formula $CH_2=CH-COOR_1$, wherein $R_1$ is an alkyl group having 2 to 8 carbon atoms, and 0.05 to 20 percent by weight of a hexahydro-s-triazine compound represented by the following formula:

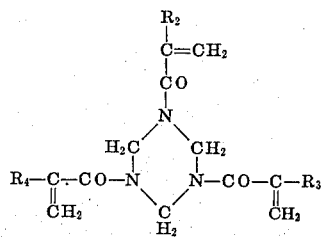

wherein $R_2$ to $R_4$ are each a member selected from the group consisting of a hydrogen atom and methyl group, each being the same or different, said graft copolymer comprising a polymerized mixture of units having the molecular structures represented by the following formulae:

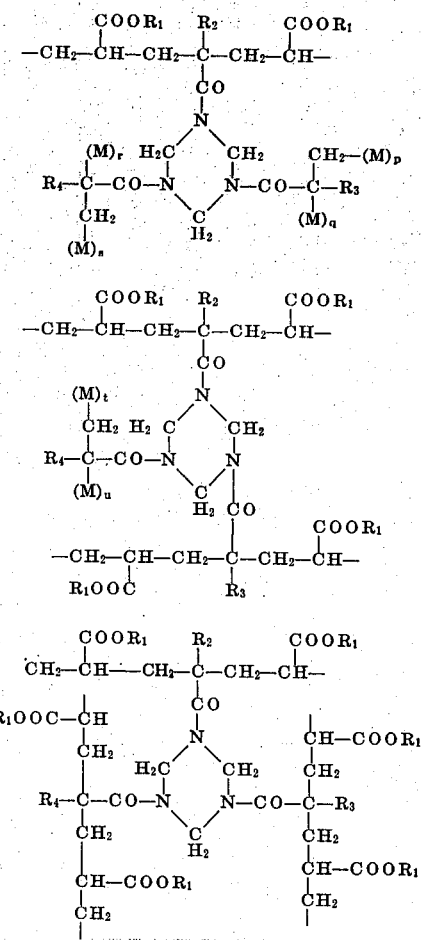

wherein p to u are whole integers of at least one.

8. A polyvinyl chloride resin composition according to claim 7, wherein the monovinyl compound is at least one member selected from the group consisting of styrene, vinyl toluene, tert-butyl styrene, acrylonitrile, acrylic acid, methyl acrylate, monochlorostyrene, dichlorostyrene, α-methylstyrene, methacrylic acid and methyl methacrylate.

9. A polyvinyl chloride resin composition according to claim 8, wherein the hexahydro-s-triazine is at least one member selected from the group consisting of 1,3,5-triacryloyl hexahydro-s-triazine, 1-methacryloyl-3,5-diacryloyl hexahydro-s-triazine, 1,3-dimethylacryloyl-1,5-acryloyl hexahydro-s-triazine and 1,3,5-trimethylacryloyl hexahydro-s-triazine.

10. A polyvinyl chloride resin composition according to claim 7, wherein the graft-efficiency of the monovinyl compound to the acrylic rubber is about 2 to 8 percent.

11. A polyvinyl chloride resin composition according to claim 7, wherein the monovinyl compound is a member selected from the group consisting of styrene, acrylonitrile, and methylmethacrylate.

12. A polyvinyl chloride resin composition according to claim 7, wherein the monovinyl compound is at least one member selected from the group consisting of vinyl aromatics, unsaturated nitriles and acrylic and methacrylic acid and esters.

13. A polyvinyl chloride resin composition according to claim 7, wherein the monovinyl compound is a mixture of styrene, acrylonitrile and methyl methacrylate.

14. A polyvinyl chloride resin composition according to claim 7, wherein said hexahydro-s-triazine compound is selected from the group consisting of 1,3,5-triacryloyl hexahydro-s-triazine, 1-methacryloyl 3,5-diacryloyl hexahydro-s-triazine, 1,3-dimethacryloyl 5-acryloyl hexahydro-s-triazine and 1,3,5-trimethacryloyl hexahydro-s-triazine.

* * * * *